United States Patent [19]

Bystrov et al.

[11] 4,147,527
[45] Apr. 3, 1979

[54] GLASS SHEET MOLDING ASSEMBLY

[76] Inventors: Nikolai M. Bystrov, Khlebnikovo, Leningradskaya ulitsa, 19, kv. 27; Anatoly N. Simonov, Dmitrovskoe shosse, 11, kv. 63; Alexandr B. Levin, Snaiperskaya ulitsa, 4, kv. 210; Jury K. Meshkov, ulitsa Bolshaya Polyanka, 4/10, kv. 4; Anatoly A. Zakharov, Dmitrovskoe shosse, 161, kv. 12; Alexei V. Kolbanev, ulitsa Dmitria Ulyanova, 14, korpus 1, kv. 6, all of Moscow, U.S.S.R.

[21] Appl. No.: 867,877

[22] Filed: Jan. 9, 1978

Related U.S. Application Data

[62] Division of Ser. No. 670,527, Mar. 25, 1976, abandoned.

[30] Foreign Application Priority Data

Mar. 28, 1975 [SU] U.S.S.R. .............................. 2117996

[51] Int. Cl.² ............................................. C03B 13/00
[52] U.S. Cl. ......................................... 65/183; 65/93; 65/184; 65/255; 425/461

[58] Field of Search .................. 65/93, 183, 184, 255; 425/461

[56] References Cited

U.S. PATENT DOCUMENTS

| 3,236,617 | 2/1966 | Jamnik et al. ..................... 65/184 X |
| 3,346,359 | 10/1967 | Forster et al. ...................... 65/93 X |
| 3,820,969 | 6/1974 | Borgrets et al. ..................... 65/184 |

FOREIGN PATENT DOCUMENTS

| 685971 | 3/1965 | Italy ........................................... 65/255 |
| 991867 | 5/1965 | United Kingdom ..................... 65/184 |

Primary Examiner—Arthur D. Kellogg
Attorney, Agent, or Firm—Robert E. Burns; Emmanuel J. Lobato; Bruce L. Adams

[57] ABSTRACT

A mold assembly for making blocks of glass and constituting five parts assembled into a mold to make a mold having a cavity open at opposite ends for molding an article of glass as a sheet cut into blocks having an upstanding flange along an edge thereof and a v-shaped ridge along an opposite edge for assembly with other similar articles along a scarf joint defined by the corresponding v-shaped ridges.

1 Claim, 3 Drawing Figures

GLASS SHEET MOLDING ASSEMBLY

This is a divisional of application Ser. No. 670,527, filed Mar. 25, 1976 now abandoned.

BACKGROUND OF THE INVENTION

The present invention relates to shaped glass articles and more particularly it relates to channel-shaped glass articles and to devices for moulding shaped glass articles.

The present invention can be utilized in various branches of industrial and civil construction, in agriculture, and also for cultural and domestic applications where the employment of said articles in various structures ensures a required microclimate in buildings and gives them modern architectural outlines.

One of the most outstanding properties of glass consists in its ability to acquire a great variety of shapes in the course of moulding. Such various shapes can be produced by hot moulding when the glass melt is in a sufficiently soft state.

Among the physical and chemical properties of glass as a material the most conspicuous role belongs to viscosity and surface tension. The process of hot moulding in the glass industry consists of two stages, viz., producing a shape and fixing it. By cooling the glass melt to the required temperature it is possible to obtain any degree of plasticity which is best for the selected moulding method. For fixing the obtained shape, the articles are cooled still more to a temperature at which the glass melt loses the last traces of fluidity.

Thus, changes in the viscosity of glass melt in accordance with temperature changes in the course of moulding of glass articles is a decisive factor. In view of the fact that glass can have practically any degree of viscosity, it can be moulded by a diversity of methods.

Using such a factor as the reversibility of the law describing the dependence of the glass melt viscosity upon its temperature, one can resort to most complicated moulding methods wherein the glass melt being moulded comes repeatedly in contact with the elements of the moulding device.

The surface tension of glass in the automatic feeders of the modern glass-moulding machines is also an important factor since without the surface tension it would be impossible to impart the required shape to the glass melt fed into the moulding device.

Thus, the viscosity and surface tension of glass melt varying with the melt temperature create the specific favourable conditions for utilizing the various moulding methods used to produce the required shape of the glass articles.

The glass is moulded at relatively high temperatures, ranging from 700° to 1000° C. when the glass melt in the contact zone interacts with the elements of the material of the moulding devices, said elements exerting a serious influence upon the quality of the moulded articles.

From the viewpoint of technology and economy, the moulding devices must meet a number of requirements, viz., they must ensure a precise surface finish of the articles, be heat-resistant and thermostable, and possess adequate chemical stability, mechanical strength, hardness and durability. These requirements depend on the moulding method and the type of articles. Accordingly, the moulding elements are made of different materials; most frequently metal, ceramics or graphite.

While manufacturing industrial grades of glass the temperature of the moulding surfaces should not exceed 500°–700° C. However, the temperature of said surfaces should not be too low either since this leads to crystallization of glass and impairs the surface of the articles.

The term "moulding" as used in the glass industry covers all the processes in which the amorphous glass melt turns into a shaped article. These processes are divided into two consecutive stages, namely primary production and finishing.

The first stage includes all the processes wherein the glass melt is the source material and the product is constituted by a finished or a semifinished article.

The second stage includes processes in which the semifinished article obtained after primary production is given its final shape, its surface is improved, ornamented, etc.

Depending on its shape, size, glass thickness and other parameters, each glass article should be made by the most economical moulding method which ensures a maximum output of the technological equipment and a minimum production cost of the article.

At present, the glass moulding methods can be divided into five major groups, viz., pressing, blowing, pressing-and-blowing, drawing, and rolling. In addition, there also is a casting method and the so-called mollification wherein the glass is reheated to a soft state and the viscosity of the glass melt is very high.

Glass articles are available in a great variety of shapes and sizes and are widely employed in various branches of industry. For example, shaped glass articles are used in the construction and erection of different elements of buildings and structures, viz., outer and inner walls, roofing, lining, light apertures, window sashes, door casings, etc.

The shaped glass articles can be channel-shaped, box-shaped, U-shaped, Z-shaped, semicircular, etc. A rich assortment of architectural and construction glass articles dictates serious differences in the technical requirements for each type of articles, in their production methods and in the composition of glass melts used for their production.

The shaped glass articles are made of ordinary alkaline and low-alkaline glass.

Of late, the shaped glass articles began to be used in agriculture for construction of hothouses and hotbeds in which the ceilings and walls are made of channel-shaped glass articles. In making glass blocks from these articles, the latter are joined with the aid of various sealing gaskets. However, unreliable sealing of these joints has checked wide employment of the shaped glass articles in various branches of construction.

The use of channel-shaped glass articles in various branches of construction aids in solving important engineering problems. It is known that the glass articles used in construction must meet the following requirements:

sufficient strength for sustaining mechanical loads;
heat-insulating ability equivalent to that of glass windows;
sound-proofing ability, i.e. acoustic requirements;
increase the light area of windows by dispensing with window sashes which is an important factor in industrial and agricultural construction;
produce dissipating light, i.e. distribute uniformly the light fluxes inside the buildings;
ensure reliable sealing between the elements of the glass articles and between the building structures which is necessary for creating a certain microclimate inside the glazed buildings;

produce a modern appearance of the building;

reduce the amount of wood utilized in window sashes and of labour involved in making and installing said sashes.

Known in the previous art are devices for moulding channel-shaped glass articles comprising elements for moulding straight flanges. The moulding device consists of plates arranged one above the other, each plate being provided with two elements shaped like a rectangular bar. Leaving the rolls, the glass strip enters the moulding device wherein two straight flanges of the shaped article are moulded with the aid of said two elements shaped like a rectangular bar.

However, the device of this type fails to produce glass articles which can be reliably sealed at the joints, this being an important factor in assembling a glass block from a multitude of such articles.

Also known in the art are moulding devices for making shaped glass articles, said devices consisting of two plates arranged one above the other; the lower plate is provided with wedge-like projections whereas the upper one has calibrating slots located above the projections of the lower plate. Located on the lower plate are two elements shaped like rectangular bars. The glass strip discharged from the rolls enters the moulding device. The wedge-like projections of the lower plate form stiffener ribs on the strip while the slots in the upper plate ensure calibration of said ribs. The straight flanges of the shaped article are bent by two elements in the form of rectangular bars.

This devices ensures additional mechanical strength of the moulded articles by providing them with stiffener ribs. However, this device too cannot produce glass articles which, being assembled into a block, would be reliably sealed at the joints between the individual elements.

SUMMARY OF THE INVENTION

The main object of the invention is to produce channel-shaped glass articles which can be joined at the flanges so as to ensure reliable sealing.

Another object of the invention is to produce a glass block with scarf joints, consisting of a multitude of said shaped glass articles.

Still another object of the invention is to provide a device for moulding said shaped glass articles which meets all the requirements of moulding the glass melt.

A further object of the invention is to provide a device which increases output and reduces the amount of electric power required for moulding shaped glass articles.

These objects are achieved by providing a glass article shaped like a channel wherein, according to the invention, one of the flanges is curved outward and has a U-shape.

It is practicable that in the block consisting of a multitude of channel-shaped glass articles one flange of which is curved outward and has a U-shape, according to the invention, the straight flange of each succeeding article would enter the U-shaped flange of the preceding article, thus making a scarf joint.

In the device for moulding said shaped glass articles comprising a flat base for delivering the glass strip and an appliance arranged above the device and intended to mould the profile of the article, according to the invention, the profile-moulding appliance is formed by a plate with a rectangular projection which ensures the moulding of the inside space of the article, and at one side of said projection there is an element installed with a clearance relative to said side, said element resting on the flat base for moulding the straight flange of the article while at the opposite side said projection adjoins another element whose inner surface corresponds to the outer surface of the U-shaped flange of the article and which accommodates a bar set with a clearance and forming, together with the inner surface of said element, a slot which serves to form the curved flange of the article.

The essence of the invention resides in the following features.

Owing to the fact that one of the flanges of the channel-shaped glass article is curved outward and has a U-shape it becomes possible to attain reliable sealing between the elements of these articles.

In the glass block assembled from a multitude of said articles the straight flange of each succeeding article enters the U-shaped flange of the preceding article thus forming a scarf joint which permits utilization of various sealing materials.

The scarf joint keeps moisture and air from penetrating between the elements so that it becomes possible to maintain a required microclimate in the buildings made of channel-shaped glass articles in which one of the flanges has a U-shape.

It becomes particularly important in hothouses wherein said glass articles can be used for roofs, walls and partitions.

The moulding device for moulding said glass articles comprises a flat base and a moulding appliance.

The introduction into the appliance of the element whose inner surface corresponds to the outer surface of the U-shaped flange of the glass article and which accommodates a bar installed with a clearance relative to said inner surface allows the delivered glass strip to be moulded into a U-shape which is free of additional internal stresses while the internal stresses produced during moulding are easily relieved by the four-stage annealing in a kiln.

The elements of the moulding appliance may have diverse configurations and be made of various materials.

Depending on the clearance between the flat base and the moulding appliance it is possible to produce glass articles of different thicknesses.

It has been proved by experience that the best thickness of glass articles from the point of view of operational and economical characteristics varies from 5 to 6 mm.

To improve the strength of the glass articles, they can be reinforced with heat-resistant netting or wire.

Thus, the channel-shaped glass article with one of its flanges curved outward and having a U-shape and the block assembled from a multitude of said articles meet all the requirements set for the shaped glass articles in construction while the device for moulding said articles meets all the requirements for moulding the glass melt into articles, mostly of a channel shape.

BRIEF DESCRIPTION OF THE DRAWINGS

Given below is a detailed description of an example of realization of the device according to the invention with reference to the accompanying drawings in which.

DESCRIPTION OF THE PREFERRED EMBODIMENTS

Figure 2:
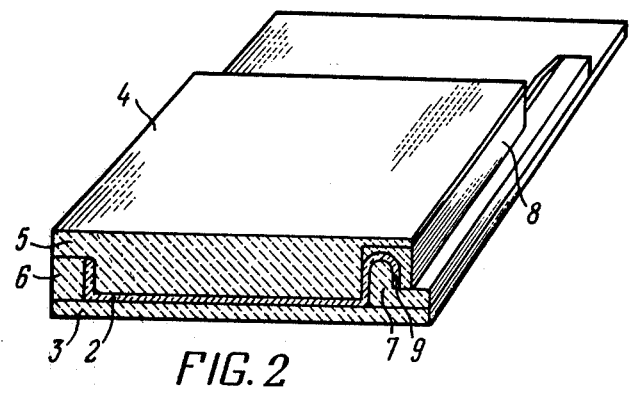
FIG. 2 is a general view of the appliance for moulding the profile of glass articles.
Figure 3:
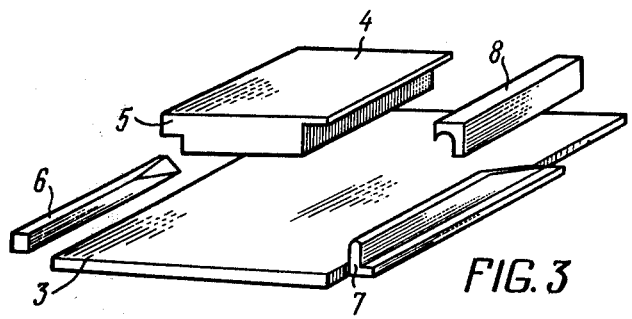
FIG. 3 is a plan view of the elements of the profile-moulding appliance.

The device for moulding shaped glass articles (FIG. 1) comprises rolls 1 which roll the glass melt delivered from the kiln into a glass strip 2 directed onto a flat base 3 located in the lower part of the moulding device. Positioned above said base 3 is an appliance for moulding the profile of the article (FIG. 3) consisting of a plate 4 with a rectangular projection 5 which moulds the inside space of the article, an element 6 set with a clearance relative to the projection 5 of the plate 4, resting on the flat base 3, and moulding the straight flange of the article, a bar 7 which is rounded in the upper part and an element 8 adjoining the projection 5 of the plate 4 at the opposite side and intended to mould the U-shaped flange of the article. The bar 7 is disposed within the inside surface of the element 8 with a clearance, forming a slot 9 (FIG. 2) which produces the curved flange of the article. The moulded article moves onto conveying rolls 10 (FIG. 1) and they carry it to the mechanism which cuts the article into specified lengths.

The device for moulding shaped glass articles according to the invention operates as follows.

The rolls 1 turn the glass melt into a continuous glass strip 2 of the requisite width and thickness. The glass strip 2 is directed onto the flat base 3 installed under the profile moulding appliance.

The plate 4 with the rectangular projection 5 set on the moving rolled glass strip interacts by one surface with the element 6 which rests on the flat base 3 and moulds the straight flange of the article. The rectangular projection 5 moulds the inside space of the article while the opposite edge of the glass strip 2 moves round the bar 7 (FIGS. 2,3) whose upper part is rounded and is pressed by the element 8 whose inner surface corresponds to the outer surface of the U-shaped flange of the article. The bar 7 is located opposite the inside surface of the element 8 with a clearance therebetween forming a slot 9 (FIG. 2) with said surface; this slot moulds the curved flange of the article finally and calibrates it throughout its length.

Figure 1:
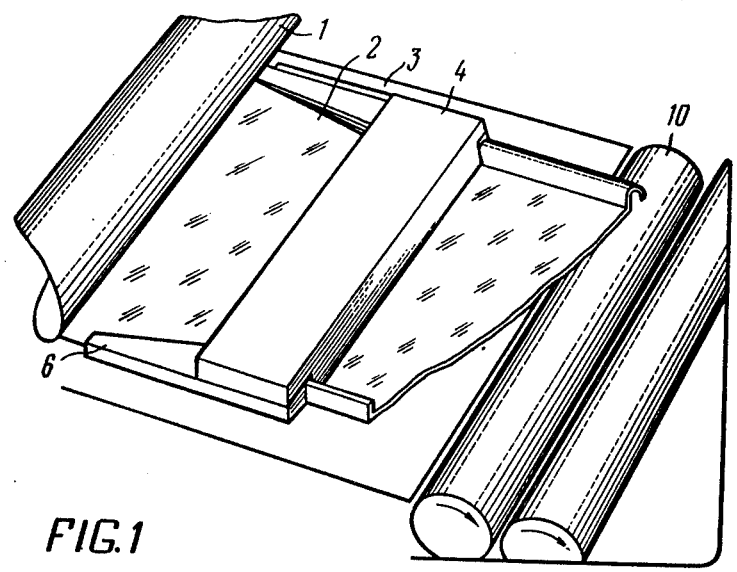
FIG. 1 is a general view of the device for moulding channel-shaped glass articles.

The moulded shaped article is drawn by an electric drive through a system of reducers with the aid of conveying rolls 10 (FIG. 1). Then the articles are delivered into the cutting mechanism.

Thus, the moulding device according to the invention is capable of producing shaped articles with a U-shaped flange.

A multitude of such articles assembled into a single block constitutes a very strong and hermetically sealed unit.

What we claim is:

1. A mold assembly for making articles of glass comprising, a flat first plate a rectangular first bar positionable on said plate resting on a major face thereof adjacent an edge of said plate, an L-shaped second bar positionable along an opposite edge of said flat plate with an upstanding ridge disposed inwardly of said edge; a third bar having an underside arcuate longitudinal recess along the full length thereof said third bar being positionable seated on said second bar with said arcuate longitudinal recess overlying said ridge and upwardly spaced therefrom, a second plate having shoulders on opposite side edges, a first of said shoulders positionable resting on said first bar and a second of said shoulders resting on said second bar, said second plate having a central region defining said shoulders and spaced inwardly away from said first bar defining an upstanding slot in the mold and spaced inwardly from the upstanding ridge on said second bar, and the central region of said second plate being disposed upwardly spaced from said major face of the first plate, whereby a mold cavity open at two opposite ends is defined for molding an article of glass therethrough as a sheet having an upstanding flange along one edge and an arcuate U-shaped flange open for assembly with other similar articles with corresponding U-shaped flanges defining a scarf joint.

* * * * *